United States Patent
Frazier

(10) Patent No.: US 8,103,479 B2
(45) Date of Patent: Jan. 24, 2012

(54) TWO DIMENSIONAL EXPONENTIAL SMOOTHING

(75) Inventor: Peter Frazier, Ithica, NY (US)

(73) Assignee: Teradata US, Inc., Dayton, OH (US)

( * ) Notice: Subject to any disclaimer, the term of this patent is extended or adjusted under 35 U.S.C. 154(b) by 439 days.

(21) Appl. No.: 11/953,101

(22) Filed: Dec. 10, 2007

(65) Prior Publication Data

US 2008/0162082 A1 Jul. 3, 2008

Related U.S. Application Data

(60) Provisional application No. 60/878,036, filed on Dec. 29, 2006.

(51) Int. Cl.
*G06F 12/00* (2006.01)
*G06F 17/00* (2006.01)

(52) U.S. Cl. ........... 702/186; 702/176; 702/79; 711/167

(58) Field of Classification Search ............. 702/57, 702/79, 120, 176, 186, 189, 190, 191; 711/167, 711/168, 170–172; 714/718–722
See application file for complete search history.

(56) References Cited

U.S. PATENT DOCUMENTS

| | | | |
|---|---|---|---|
| 6,205,431 B1* | 3/2001 | Willemain et al. ............. 705/10 |
| 6,418,438 B1* | 7/2002 | Campbell ............................. 1/1 |
| 6,622,221 B1* | 9/2003 | Zahavi ........................... 711/154 |
| 6,647,458 B1* | 11/2003 | Glynn ............................ 711/112 |
| 7,301,903 B2* | 11/2007 | Brady ............................ 370/230 |
| 2003/0115410 A1* | 6/2003 | Shriver ......................... 711/113 |
| 2004/0054850 A1* | 3/2004 | Fisk .............................. 711/112 |
| 2004/0117557 A1* | 6/2004 | Paulraj et al. ................. 711/137 |
| 2004/0148610 A1* | 7/2004 | Tsun et al. .................... 719/316 |
| 2005/0138285 A1* | 6/2005 | Takaoka et al. ............... 711/114 |
| 2005/0227361 A1* | 10/2005 | Kratzer ........................... 436/63 |
| 2005/0228652 A1* | 10/2005 | Ehara et al. ................... 704/219 |
| 2005/0278597 A1* | 12/2005 | Miguelanez et al. ......... 714/738 |
| 2006/0056721 A1* | 3/2006 | Todd ............................. 382/260 |

* cited by examiner

*Primary Examiner* — Hal Wachsman

(57) ABSTRACT

A method of estimating the average response time and average I/O size that can be used as an alternative for or addition to existing response time and I/O estimation techniques. One method involves initializing values for an average response time and an average I/O size, and initializing an angle. Measurements of the I/O size and response times are received. The technique involves adjusting the average I/O size using the current value of the average I/O size and the received I/O size measurement. The average response time is adjusted using the current value for the average response time and the received response time measurement. The angle value is adjusted using the adjusted average I/O size, the current angle value and the I/O size and time measurements. The slope and y-intercept of a line, formed by plotting the average I/O size verses response time, can then be reported.

23 Claims, 5 Drawing Sheets

FIG. 3
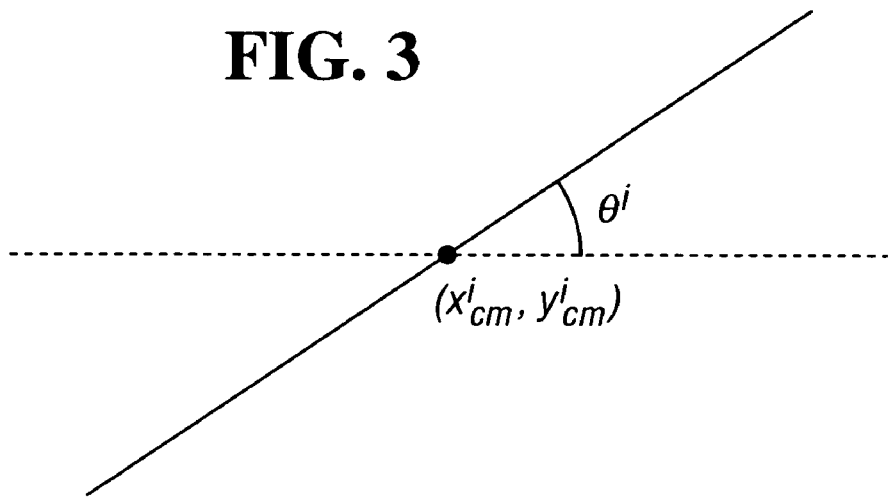
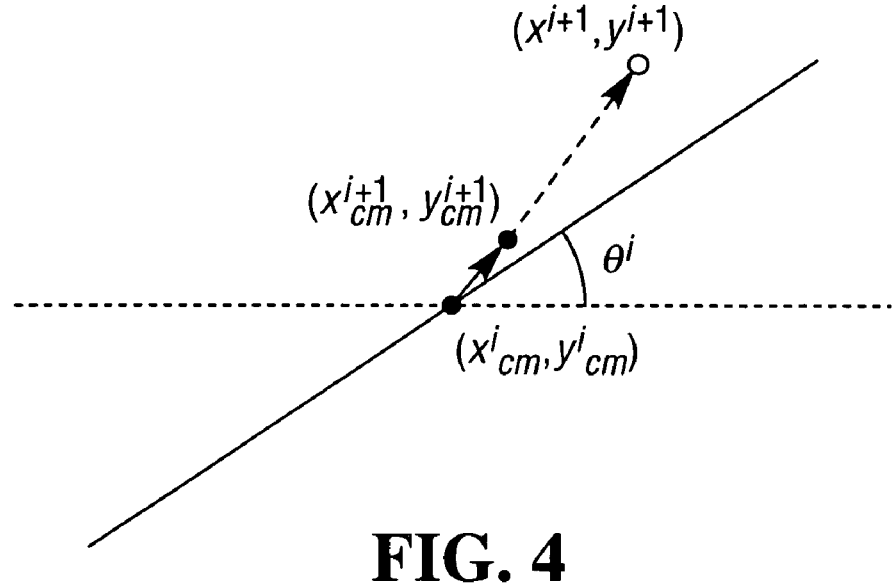
FIG. 4

US 8,103,479 B2

TWO DIMENSIONAL EXPONENTIAL SMOOTHING

CROSS REFERENCE TO RELATED APPLICATIONS

This application claims priority under 35 U.S.C. §119(e) to the following patent application, now abandoned, which is incorporated herein by reference:

Provisional Application Ser. No. 60/878,036, entitled "TWO DIMENSIONAL EXPONENTIAL SMOOTHING," filed on Dec. 29, 2006, by Peter Frazier.

BACKGROUND

Data stored on a data storage device is accessed by I/O commands. These commands are used for reading data stored on a storage device and writing data to a storage device. If I/O commands are issued randomly to a zone within a storage device, each I/O response time forms a line when plotted against the size of data being read.

The response time is made up of transfer time, which is the I/O size multiplied by the constant transfer rate, and other components that do not depend on I/O size. The other components include rotational latency, seek time and wait time. On a data storage disk, rotational latency time taken by the disk platter to spin until the data is under the disk head and the read or write command can proceed. Seek time is the time taken when the disk head is moving radially to the track on which the data begins. Wait time is the time for other I/O commands to complete during which the operating system or storage device is waiting. The transfer time is the time between the disk head reaching the first block of data and reading the last block of data. This is the time it takes the disk head to physically read data off the storage device. The transfer rate is constant for most I/O sizes so transfer time increases linearly with the amount of data to be transferred. The transfer rate might not be constant for extremely large I/Os of several gigabytes or larger. If an I/O is so large that it spans two or more physical disk zones, the transfer rate may change when the disk head enters a new disk zone.

The response time is=to the rotational latency+the seek time+the wait time+(the I/O size/the data transfer rate). This is equal to a constant+(1/the transfer rate)×the I/O size. Thus the response time forms the straight line of the form y=ax+b where the slope is (1/the transfer time) and the y intercept is the sum of rotational latency, seek time and wait time.

Statistical techniques to measure the y-intercept and slope from a data set include linear regression and exponential smoothing. Linear regression can be used to estimate the y-intercept and slope from the static data set. Using linear regression each time a new measurement arrives the linear regression must be re-run on the entire data set to update the result. This technique is too computationally expensive for practical use on a data set where new measurements are constantly provided.

Exponential smoothing can estimate the value of a single parameter changing in time from a stream of noisy measurements of that variable. Exponential smoothing is essentially an average that weights recent measurements more heavily than older measurements. An estimate is adjusted towards each new measurement. A configurable step size α controls the size of the adjustment according to the equation.

$$k_i = \alpha x_i + (1-\alpha) k_{i-1}$$

The disadvantage of exponential smoothing is that it can only operate on the single parameter.

SUMMARY

Described below is a method of estimating the average response time and average I/O size that can be used as an alternative for an addition to existing response time and I/O estimation techniques. One technique described below involves initializing values for an average response time and an average I/O size, and initializing an angle. Measurements of the I/O size and response times are received. When measurements of the I/O size and response time are received the technique involves adjusting the average I/O size using the current value of the average I/O size and the received I/O size measurement. The average response time is adjusted using the current value for the average response time and the received response time measurement. The angle value is adjusted using the adjusted average I/O size, the current angle value and the I/O size and time measurements. The slope and y-intercept of a line, formed by plotting the average I/O size verses response time, can then be reported.

In some cases initial values for the average I/O size and response times will be available. One method of estimating the average I/O size and response time uses initial values of the average I/O size and response time. If initial values are not available, then the average I/O size and response time are initialized from the first two measurement values or the first N measurements values where N is a number of values until at least two different response times and I/O sizes are received.

Also described below are methods of estimating the average response time and I/O size from a plurality of measurements. In one form, initial values are created for the average response time, average I/O size and an angle value. The initial values are stored on computer readable medium. At least one step size value is also stored on a computer readable medium. When new response time measurements and new I/O size measurements are received, the stored response time average I/O size and angle are accessed from the computer readable medium. An updated average response time, average I/O size and angle are determined using the response time, average I/O size, angle, step size and new response time and average I/O measurements. A slope value and intercept value are determined from the updated average response time, average I/O size and angle. The updated average response time, average I/O size, angle, slope value and intercept value are then stored on computer readable medium.

BRIEF DESCRIPTION OF THE DRAWINGS

FIG. 3 is a representation of the first step of the algorithm.
FIG. 4 is a representation of the second step of the algorithm.

DETAILED DESCRIPTION

Figure 1:
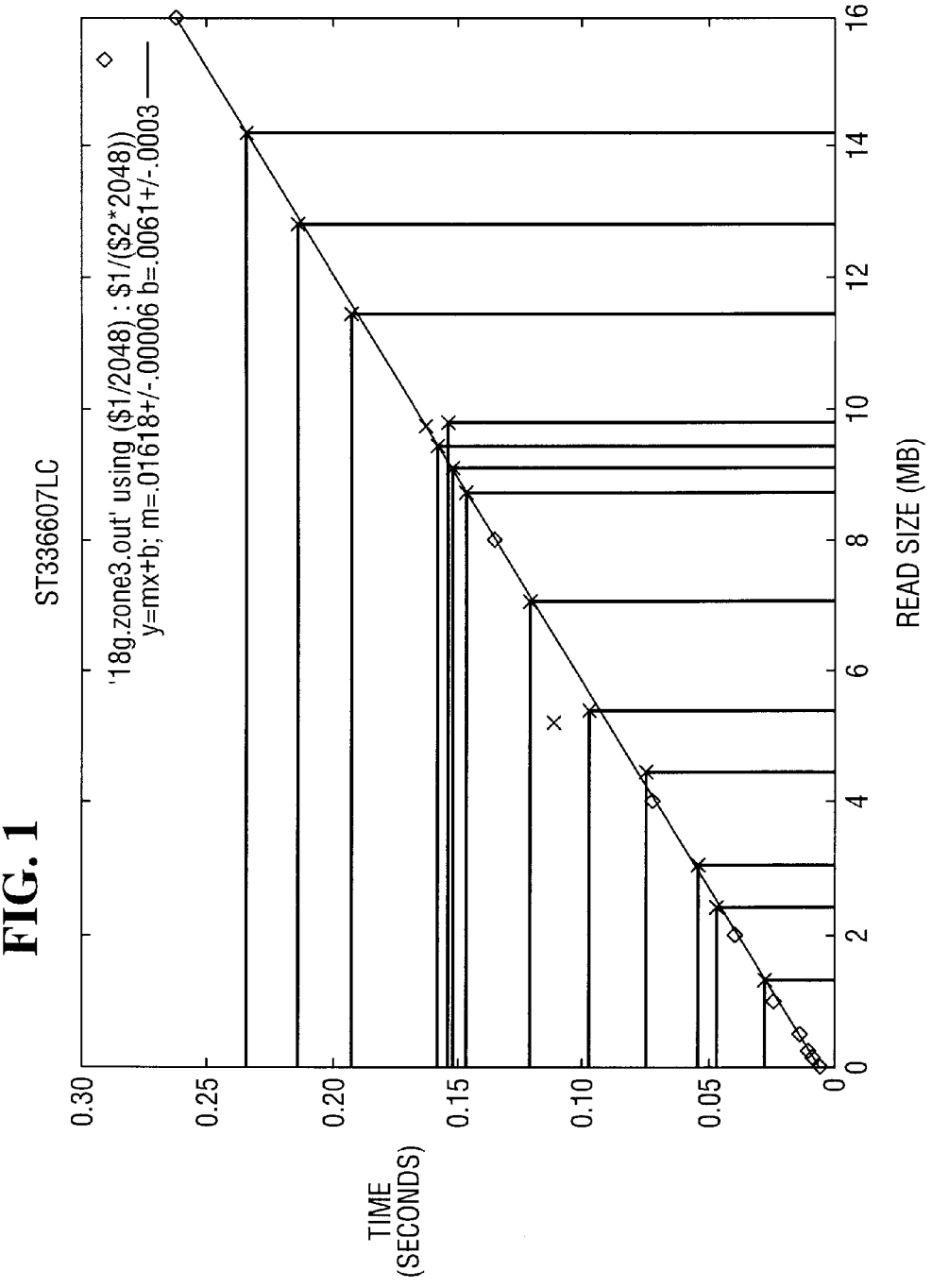
FIG. 1 is a graph showing response time versus I/O size.

FIG. 1 is a graph showing response time versus I/O size where I/Os are issued randomly to a disk within a storage device. As can be seen in FIG. 1, the response time versus I/O size forms a straight line with the y-intercept. In FIG. 1 the y intercept occurs at 0.0061 seconds. The response time for each I/O command is made up of the time taken to transfer data and other components that do not depend on the I/O size. The time taken to transfer data is the I/O size multiplied by the constant data transfer rate. The other components are rotational latency, seek time and wait time. Rotational latency is the time it takes for the disk platter to spin until data is under the disk head. Seek time is the time for the disk head to moving radially to the track on which the data begins. Wait time is the time taken by storage devices waiting for other I/O commands to conclude. These three components are responsible for the y-intercept on FIG. 1. These components may vary slowly over time.

Typically the transfer rate is constant for all I/O sizes but variations do occur. The transfer rate is not constant for extremely large I/Os of several gigabytes or larger. If an I/O is so large that it spans two or more disk zones, the transfer rate will change when the disk head enters the new disk zone. This problem is avoided in Teradata systems because all I/Os issued are smaller than 3872 blocks or about 2 megabytes. The transfer rate of two small I/Os issued to different zones will also be different. The number of physical clusters that span disk zones is small: of the order, for example, of 20 or fewer on storage devices with thousands of clusters. For example, 9 gigabyte disks have about 4,500 physical clusters and 73 gigabyte disks have about 36,500 physical clusters. The transfer time is the time between the disk head reaching the first block of data and reading the final block of data.

The response time is the sum of the rotational latency, seek time, wait time and the I/O size divided by the transfer rate. This is equal to a constant+(1/the transfer rate)×the I/O size.

Data from a stream of I/O commands can be used to predict how a measured storage location, also known as a physical cluster, will behave under an I/O workload with different average I/O sizes. The response must be measured at run time because the transfer rate, rotational latency, seek time and wait time all change with run time conditions. In particular, the wait time will increase or decrease with increased or decreased I/O loads.

To measure the response time or provide an estimate of the response time at run time the y-intercept and slope of the graph of FIG. 1 need to be measured for a particular physical extent. From this the behavior of the physical extent can be predicted under I/O workload with different I/O sizes.

Figure 2:
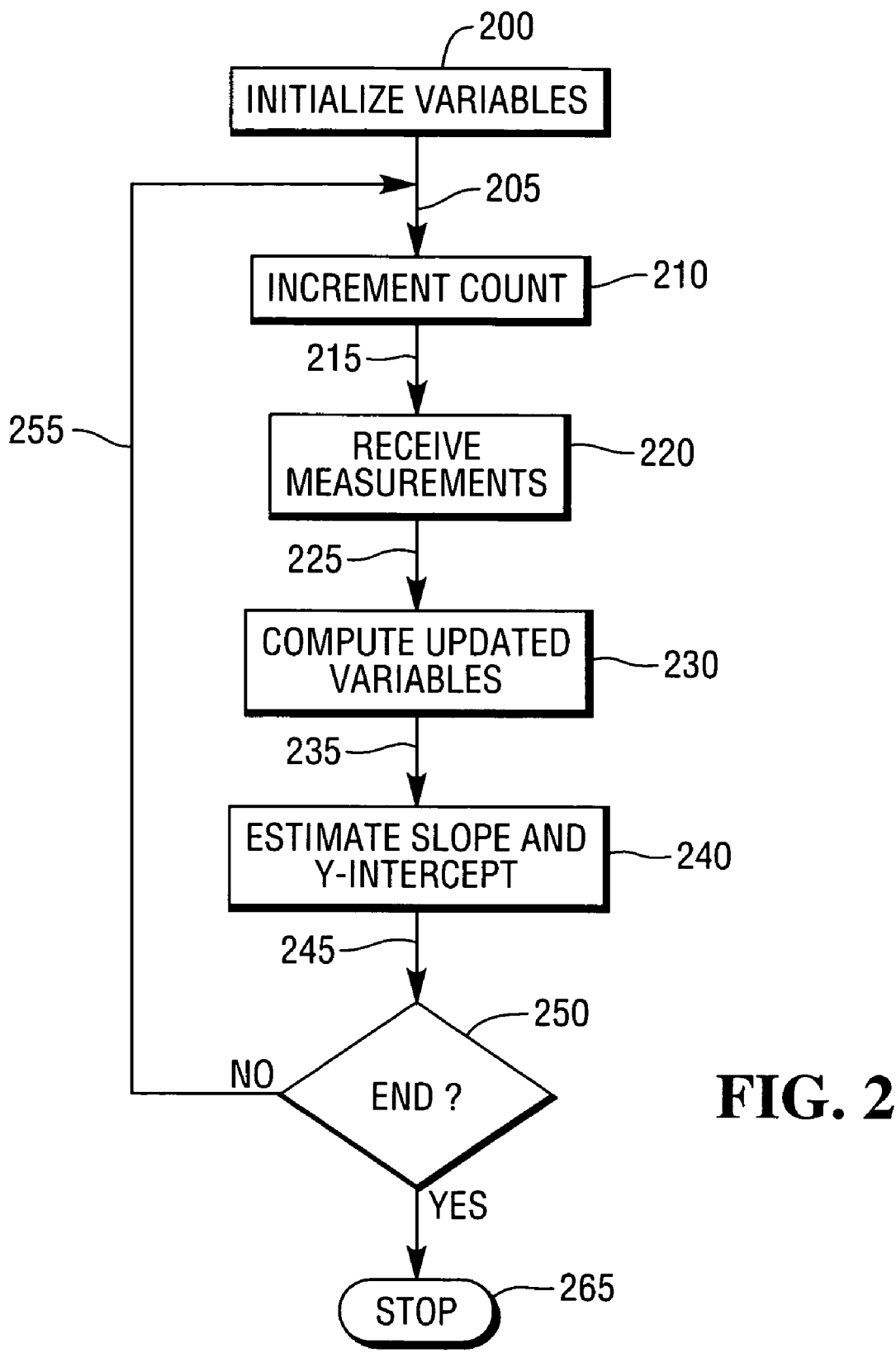
FIG. 2 is a flow chart showing two dimensional exponential smoothing.

FIG. 2 is a flowchart showing the process of two dimensional exponential smoothing. This process accepts an input stream of noisy measurements of two variables. There is a linear relationship between the variables. One example of input variables is an I/O response time and I/O size. Two dimensional exponential smoothing continuously estimates the y-intercept and slope of the linear relationship between the two variables. First three variables are initialized (step 200). These variables represent x and y variables on a graph and an angle θ. Initialization of the variables depends on whether prior knowledge of the system is available or not. If prior estimates are available for x, y and θ these values are used to initialize the algorithm. Alternatively, if prior estimates of the slope, y-intercept and average I/O size are available, the algorithm can be initialized using the equations $$x_o^{cm} = \text{average I/O size}$$

$$y_o^{cm} = y\text{-intercept} + \text{slope} \times \text{average I/O size}$$

$$\theta = \arctan(\text{slope})$$

If no prior knowledge or estimates of response time, average I/O size and angle are available the variables can be initialized from the first two measurements. If the first two measurements are at different points the algorithm is initialized using the equations $$x_o^{cm} = \frac{1}{2}(x_1 + x_2)$$

$$y_o^{cm} = \frac{1}{2}(y_1 + y_2)$$

$$\theta = \arctan\left(\frac{y_1 - y_2}{x_1 - x_2}\right)$$

If the first two measurements are identical then further measurements must be collected until a different measurement is received. In this case the algorithm is initialized using the following equations $$x_0^{cm} = \frac{1}{n}\sum_{i=1}^{n} x_i$$

$$y_0^{cm} = \frac{1}{n}\sum_{i=1}^{n} y_i$$

$$0 = \arctan\left(\frac{y_1 - y_n}{x_1 - x_n}\right)$$

Initial values for the average I/O size might come from prior knowledge of the I/O workload. Initial values for response times might come from initial values of transfer rate, rotational latency and seek time as provided by the drive manufacturer. These values can be combined with some estimate of the wait time based on estimates of the I/O workload. Initial values might also come from values obtained on similar disks with similar workloads.

After the variables are initialized count variable i is incremented by 1 (step 210).

The system waits until new measurement of the response time and average I/O size values are received (step 220).

The average I/O size response time and angle are updated using the following equations (step 230).

$$x_i^{cm} = ax_i + (1-a)x_{i-1}^{cm}$$

$$y_i^{cm} = \beta y_i + (1-\beta)y_{i-1}^{cm}$$

$$\theta_i = \gamma \arctan\left(\frac{y_i - y_i^{cm}}{x_i - x_i^{cm}}\right) + (1-\gamma)\theta_{i-1}$$

In these equations α is step size between 0 and 1. The value of the step size is chosen to give a particular weighting to the previous computed value of the average I/O size and the current I/O measurement. If the step size α is less than 0.5 then the previous average I/O size carries more weight than the current I/O measurement. If the step size is greater than 0.5, the current I/O measurement carries more weight than the previous average I/O size.

Like the step size used for computing the average I/O size, the step size β used for updating the response time is between 0 and 1. If the step size β is less than 0.5 then greater weight is given to the previous response time. If the step size β is greater than 0.5 greater weight is given to the response time measurement. A typical value for the step size is 0.3. The step size used for updating the response time can be the same as that used for updating the average I/O size.

Step size γ is used to provide weighting to the new angle calculation and the previous angle. The step size γ is between 0 and 1. If the step size γ is greater than 0.5 then more weighting is given to the new angle value. If the step size is less than 0.5 then more weighting is given to the previous angle value. Step size γ is related to the step sizes for x and y. If the step sizes for x and y are different the step size for γ will need to take this into account.

The step sizes are determined based on how quickly the true values measured change with time and how noisy the measurements are. These values are rotational latency, seek time, wait time and transfer rate. If values change quickly the step size should be larger or increased. If values change slowly the step size should be smaller or decreased. If measurements are noisy the step size should be decreased.

The step size can be changed while the algorithm is running. For example, the step size can be set to 1/n to give the same result as simple averaging. Other ways the vary the step size include the use of McClain's rule, Trigg's rule and generalized harmonic step sizes.

The slope of the line is determined as the tangent of the angle and the y-intercept is determined as the current response time minus the current average I/O size multiplied by the slope (step 240). These values can then be supplied to other parts of the system and used to predict the average response time for an average I/O size.

The question is asked whether all measurements have been received (step 250). If all measurements have been received the algorithm ends (step 265). If all measurements have not been received then the arrow 255 is followed back to step 210 and the value of count i is incremented.

$$\theta = \arctan\left(\frac{y_1 - y_2}{x_1 - x_2}\right)$$

$$\theta = \arctan\left(\frac{0.097 - 0.153}{5.4 - 9.8}\right)$$

$$= 0.012727 \text{ radians}$$

Following the initialization of the response time, I/O size and angle, the count value i is incremented.

After the value of i is incremented arrow measurements for current response time and I/O size are received (step 220). In the example shown in Table 1 these measurements are response time of 0.029 seconds and I/O size of 1.3 MB. The average size I/O size and average response time are calculated as 5.71 and 0.0962 respectively using the formulas given (step 230). The angle is then calculated as 0.01348 radians. The slope of the line is estimated as 0.013481 and y-intercept as 0.019226 (step 240). As this program has not ended arrow 255 is followed to increment the value of i and wait until the next measurements are received. The next measurements are response time 0.49 seconds and I/O size 2.4 MB. Iterations continue until either the program is stopped or no more data is received. In the example shown in Table 1 step sizes α, β and γ have all been set at 0.3. 0.3 is a typical step size for one dimensional exponential smoothing. As can be seen in Table 1 as more data is received the average I/O size and average response time will start converging.

In the example given in Table 1 the step size as α β and γ are all constant and are all 0.3. In alternative embodiments the

TABLE 1

| response time | I/O size | x0cm | y0cm | theta | slope | y-intercept |
|---|---|---|---|---|---|---|
| 0.097 | 5.4 | 7.6 | 0.125 | 0.012727 | | |
| 0.153 | 9.8 | 7.6 | 0.125 | 0.012727 | | |
| 0.029 | 1.3 | 5.71 | 0.0962 | 0.01348 | 0.013481 | 0.019226 |
| 0.049 | 2.4 | 4.717 | 0.08204 | 0.013713 | 0.013714 | 0.01735 |
| 0.151 | 9.1 | 6.0319 | 0.102728 | 0.014319 | 0.01432 | 0.016351 |
| 0.23 | 14.2 | 8.48233 | 0.14091 | 0.014697 | 0.014699 | 0.016232 |
| 0.153 | 11.5 | 9.387631 | 0.144537 | 0.01149 | 0.011491 | 0.036667 |
| 0.193 | 12.8 | 10.41134 | 0.159076 | 0.012304 | 0.012304 | 0.030973 |
| 0.12 | 7 | 9.387939 | 0.147353 | 0.012049 | 0.012049 | 0.034235 |
| 0.056 | 3.1 | 7.501557 | 0.119947 | 0.012792 | 0.012793 | 0.02398 |
| 0.159 | 9.5 | 8.10109 | 0.131663 | 0.014816 | 0.014817 | 0.011626 |
| 0.076 | 4.4 | 6.990763 | 0.114964 | 0.014883 | 0.014884 | 0.010913 |
| 0.146 | 8.7 | 7.503534 | 0.124275 | 0.015865 | 0.015866 | 0.005223 |

Table 1 shows an example of I/O size and response times as they are received. In this example there is no prior knowledge of either the average I/O size or the response time. In this case initialization of variables $y_0^{cm}$, $x_0^{cm}$ and $\theta_0$ occurs after the first two measurements are received. When these measurements are received the algorithm is initialized using the equations $$x_0^{on} = \frac{1}{2}(x_1 - x_2)$$

$$= \frac{1}{2}(5.4 = 9.8)$$

$$= 7.6$$

$$y_0^{on} = \frac{1}{2}(y_1 - y_2)$$

$$= \frac{1}{2}(0.097 = 0.153)$$

$$= 0.125$$

step size may be different for computing the average I/O size, average response time and angle. It is also possible to adjust the step size during the running of the smoothing algorithm.

Figure 5:
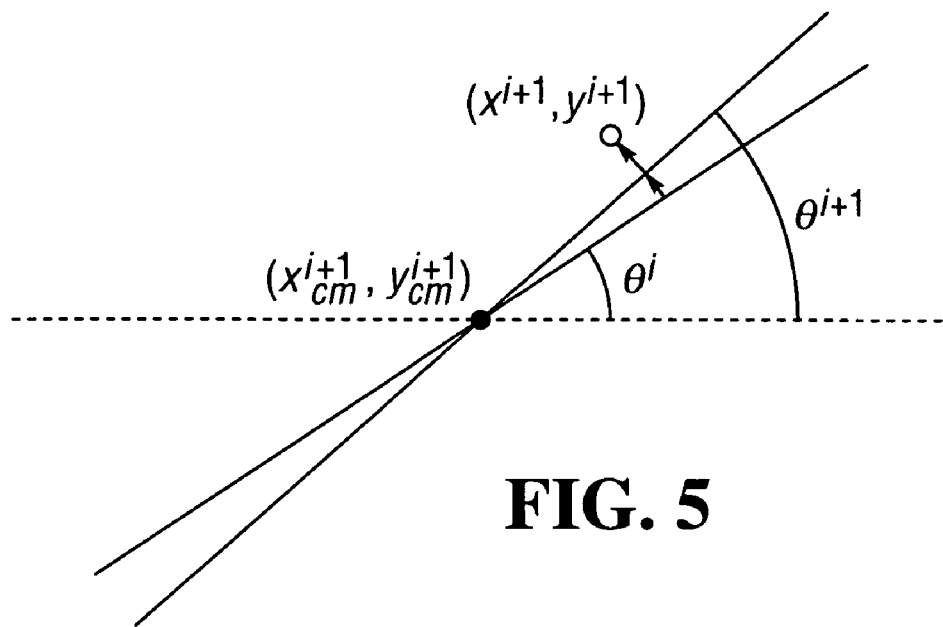
FIG. 5 is a representation of the third step of the algorithm.
Figure 6:
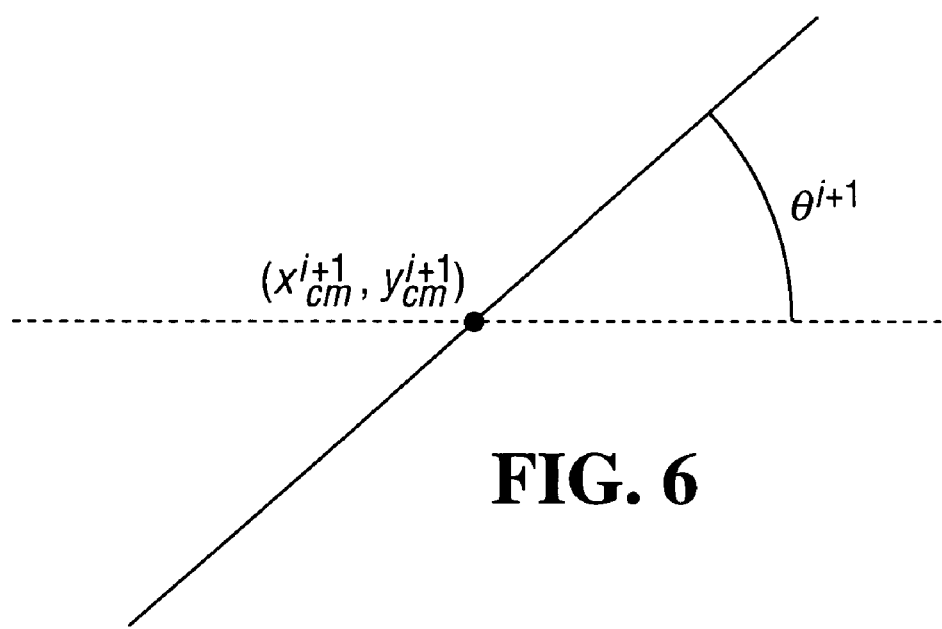
FIG. 6 is a representation of the fourth step of the algorithm.

FIG. 3 shows graphically the first step of the algorithm. In this step there is an initial estimate of the average I/O size and response time and an initial angle. In FIG. 4 a new response time and I/O size $x_{i+1}$ and $y_{i+1}$ are received. Using the equations in box 230 of FIG. 2 a new average response time and new average I/O size $x_i^{cm}$ are calculated. In FIG. 5 a new angle $\theta_{i+1}$ is calculated using the final equation of box 230 in FIG. 2. FIG. 6 shows the new average response time, new average I/O size and new angle. This process is repeated every time new measurements for the response time and I/O size are received.

Figure 7:
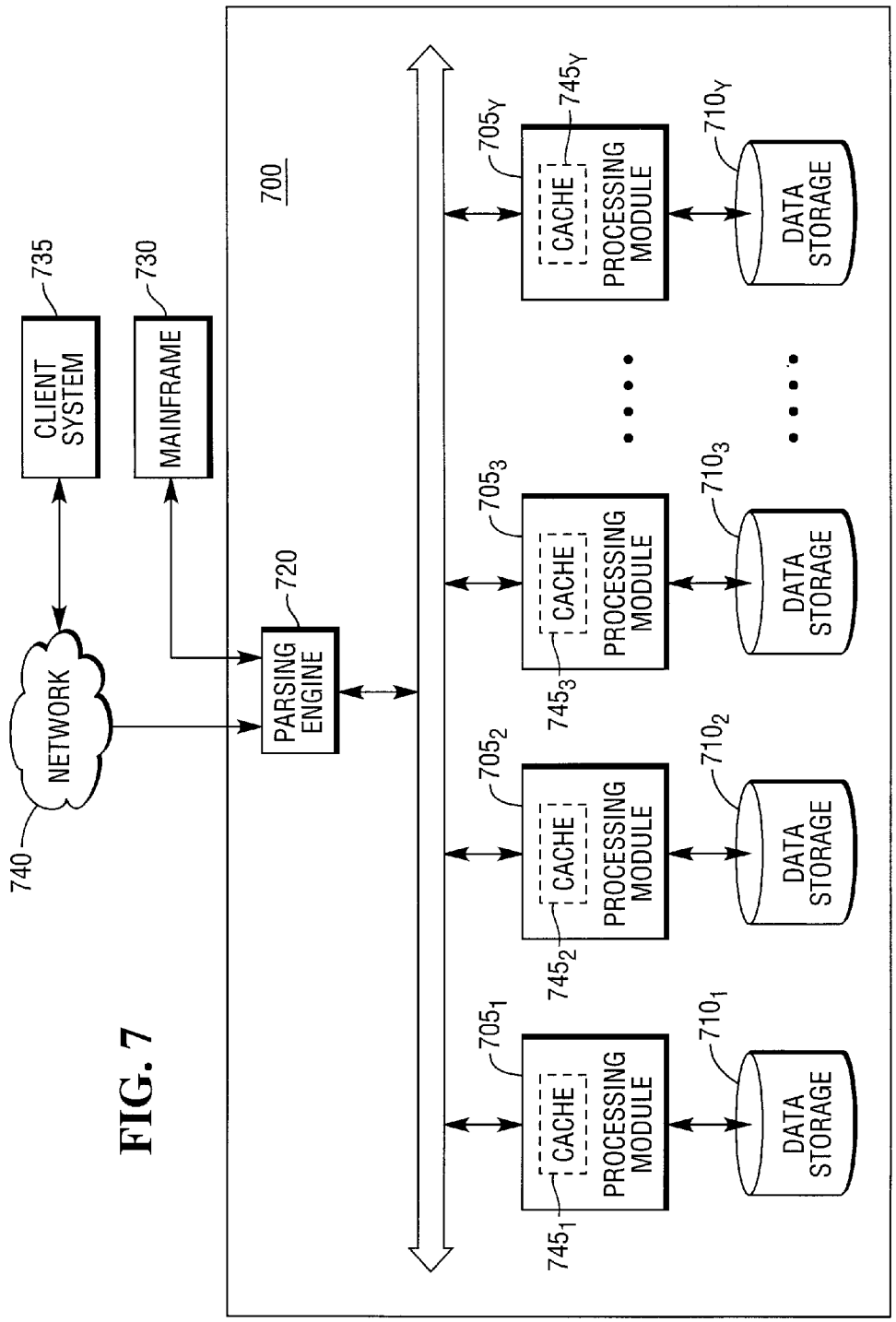
FIG. 7 is a block diagram of an exemplary large computer system in which the techniques described below are implemented.

FIG. 7 shows an example of one type of computer system in which the above techniques of data cache management is implemented. The computer system is a data warehousing system 700, such as a TERADATA data warehousing system sold by NCR Corporation, in which vast amounts of data are stored on many disk-storage facilities that are managed by many processing units. In this example, the data warehouse 700 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

As shown here, the data warehouse 700 includes one or more processing modules $705_{1\ldots y}$ that manage the storage and retrieval of data in data-storage facilities $710_{1\ldots y}$. Each of the processing modules $705_{1\ldots y}$ manages a portion of a database that is stored in a corresponding one of the data-storage facilities $710_{1\ldots y}$. Each of the data-storage facilities $710_{1\ldots y}$ includes one or more disk drives. The processing modules manage measurement and prediction of I/O size and response times.

A parsing engine 720 organizes the storage of data and the distribution of data objects stored in the disk drives among the processing modules $705_{1\ldots y}$. The parsing engine 720 also coordinates the retrieval of data from the data storage facilities $710_{1\ldots y}$ in response to queries received from a user at a mainframe 730 or a client computer 735 through a wired or wireless network 740. A data cache $745_{1\ldots y}$ managed is stored in the memory of the processing modules $705_{1\ldots y}$. The parsing engine contains the program described above for predicting the response time of the data storage devices. The parsing engine can use the program described above to organize storage of data in the data storage device with the best dedicated response time. Alternatively the program is run in each processing module.

The technique described above can be applied to a single cluster and/or all clusters in a disk zone on a single disk. A disk zone is an area of a disk on in which the data has the same number of bits per rotational angle subtended.

Alternatively, the method can be applied to measurements of any kind of linear relationship that changes with time. Examples include measuring the effect of a drug on a patient over time as a function of drug quantity for medical purposes; measuring advertising effectiveness by calculating the number of customers as a function of advertising dollars spent over time; measuring the wait time on lines at an amusement park as a function of the number of people in the line; measuring the transmission delay in a medium as a function of distance traveled.

The broader method comprises estimating the slope and y-intercept of a line representing a linear relationship that changes in time from a plurality of measurements by first initializing values for a time value and a measured value and initializing an angle value. The received measurements have a measured value measurement and time measurement. For example, the wait time in a queue of 50 people in an amusement park may be 10 minutes. The measured value is updated using the following equation $x_i^{cm} = \alpha x_i + (1-\alpha) x_{i-1}^{cm}$ where $x_{i-1}^{cm}$ is the current value for the measured value and $x_i$ is the received measured value measurement. The time value is updated using the following equation $y_i^{cm} = \beta y_i + (1-\beta) y_{i-1}^{cm}$ where $h_{i-1}^{cm}$ is the current value for the average time and $y_i$ is the received time measurement. The angle value is updated using the following equation $$\theta_i = \gamma \arctan\left(\frac{y_i - y_i^{on}}{x_i - x_i^{on}}\right) + (1-\gamma)\theta_{i-1}.$$

The next slope and angle value can then be reported. The method can be implemented in a computer program.

The text above describes one or more specific embodiments of a broader invention. The invention also is carried out in a variety of alternative embodiments and thus is not limited to those described here. Those other embodiments are also within the scope of the following claims.

What I claim is:

1. A method of estimating the slope and y-intercept of a line representing response time versus I/O size for a data storage device, the method comprising the steps of:
   a) initializing values for an average response time and average I/O size for said data storage device;
   b) initializing an angle value;
   c) receiving at a processor a size measurement and response time measurement for an I/O directed to said data storage device;
   d) adjusting by said processor the average I/O size using a current value for the I/O size and the received I/O size measurement;
   e) adjusting by said processor the average response time using a current value for the average response time and the received response time measurement;
   f) adjusting by said processor the angle value using the adjusted average I/O size, the adjusted average response time, the current angle value, the received I/O size measurement, and the received response time measurement;
   g) reporting by said processor a next slope using the adjusted angle value; and
   h) reporting by said processor a next y-intercept using the next slope, the adjusted average I/O size, and the adjusted average response time.

2. The method of claim 1 further including the step of repeating step c) through step f).

3. The method of claim 1 wherein the step of adjusting the average I/O size adjusts the average I/O size according to $$x_i^{cm} = \alpha x_i + (1-\alpha) x_{i-1}^{cm}$$

where $x_i^{cm}$ is a new average I/O size;
$x_{i-1}^{cm}$ is the current average I/O size;
$\alpha$ is a step size; and
$x_i$ is the received I/O size measurement.

4. The method of claim 3 wherein $\alpha$ is 0.3.

5. The method of claim 1 wherein the step of adjusting the average response time adjusts the average response time according to $$y_i^{cm} = \beta y_i + (1-\beta) y_{i-1}^{cm}$$

where $y_i^{cm}$ is a new average response time;
$y_{i-1}^{cm}$ is the current average response time;
$\beta$ is a constant step size; and
$y_i$ is the received response time measurement.

6. The method of claim 5 wherein $\beta$ is 0.3.

7. The method of claim 1 wherein the step of adjusting the angle value adjusts the angle according to $$\theta_i = \gamma \arctan\left(\frac{(y_i - y_i^{cm})}{(x_i - x_i^{cm})}\right) + (1-\gamma)\theta_{i-1}$$

where $\theta_i$ is the next angle;
$\gamma$ is a step size;
$y_i$ is the received response time measurement;
$y_i^{cm}$ is a next average response time;
$x_i$ is the received size measurement;
$x_i^{cm}$ is a next average size estimate; and
$\theta_{i-1}$ is the current angle value.

8. The method of claim 7 wherein γ is 0.3.

9. The method of claim 1 wherein the next slope ($m_j$) is determined according to $$m_i = \tan(\theta_i)$$

where $\theta_i$ is the adjusted angle value.

10. The method of claim 9 wherein the next y-intercept ($b_i$) is calculated according to $$b_i = y_i^{cm} - x_i^{cm} m_i.$$

where $x_i^{cm}$ is the adjusted average I/O size; and $y_i^{cm}$ is the adjusted average response time.

11. The method of claim 1 further comprising the step of reporting the average I/O size.

12. The method of claim 1 further comprising the step of reporting the average I/O response time.

13. The method of claim 1 wherein the average response time, the average I/O size, and the angle value are initialized with an estimate of the average response time, an estimate of the average I/O size, and an estimate of the angle value.

14. The method of claim 1 wherein the average response time and the average I/O size are initialized with a first and second read measurement from I/O.

15. The method of claim 1 wherein the average response time, the average I/O size, and the angle value are initialized with an estimate of y-intercept, slope, and average I/O size.

16. The method of claim 1 wherein the angle value is initialized as a function of the slope.

17. The method of claim 1 wherein the angle value ($\theta_0$) is initialized according to $$\theta_0 = \arctan\left(\frac{y_1 - y_2}{x_1 - x_2}\right)$$

where $x_1$ and $x_2$ are first and second measurements, respectively, of said I/O size;
and $y_1$ and $y_2$ are first and second measurements, respectively, of said response time.

18. The method of claim 1 wherein the average response time and the average I/O size are initialized with the average of the first N time measurements wherein N is an integer.

19. The method of claim 1 wherein the angle value is initialized according to $$\theta_0 = \arctan\left(\frac{y_1 - y_n}{x_1 - x_n}\right)$$

where $x_1$ and $x_n$ are first and $n^{th}$ measurements, respectively, of said I/O size;
and $y_1$ and $y_n$ are first and $n^{th}$ measurements, respectively, of said response time.

20. A method of measuring how a data storage location will perform under I/O workload comprising;
creating initial values for an average response time, an average I/O size and an angle value for said data storage location,
storing the initial values on a computer readable medium,
storing at least one step size on said computer readable medium,
receiving at a processor a new response time measurement and a new I/O size measurement for an I/O directed to said data storage location,
accessing by said processor the stored average response time, the stored average I/O size and the stored angle value from the computer readable medium,
determining by said processor an updated average response time, an updated average I/O size and an updated angle value using the average response time, the average I/O size, the angle value, a step size, the new response time measurement and the new I/O size measurement,
determining by said processor a slope value and intercept value from the updated average response time, the updated average I/O size and the updated angle value, and
storing by said processor the updated average response time, updated average I/O size, updated angle value, the slope value and the intercept value on said computer readable medium.

21. A method of estimating an average response time and an average I/O size for a data storage device, the method comprising the steps of;
creating initial values for the average response time, average I/O size and an angle value for said data storage device,
storing the initial values on a computer readable medium,
storing at least one step size on said computer readable medium,
receiving at a processor a new response time measurement and a new I/O size measurement for an I/O directed to said data storage device,
accessing by said processor the stored average response time, the stored average I/O size and the stored angle value from the computer readable medium,
determining by said processor an updated average response time, an updated average I/O size and an updated angle value using the stored average response time, the stored average I/O size, the stored angle value, step size and the new response time measurement and the new I/O size measurement,
determining by said processor a slope value and an intercept value from the updated average response time, the updated average I/O size and the updated angle value, and
storing by said processor the updated average response time, the updated average I/O size, the updated angle value, the slope value and the intercept value on said computer readable medium.

22. The method of claim 21 further comprising waiting for a query of the slope value and intercept value and accessing the slope value and intercept value from the computer readable medium upon receipt of the query.

23. A non-transitory computer-readable storage medium containing computer instructions stored therein for causing a computer processor to estimate an average response time and an average I/O size for a data storage device, the computer instructions causing said computer processor to:
create initial values for the average response time, average I/O size and an angle value for said data storage device,
store the initial values on a computer-readable storage device,
store at least one step size on said computer-readable storage device,
receive at a processor a new response time measurement and a new I/O size measurement for an I/O directed to said data storage device,
access by said processor the stored average response time, the stored average I/O size and the stored angle value from the computer readable storage device,
determine by said processor an updated average response time, an updated average I/O size and an updated angle value using the average response time, the average I/O size, the angle value, a step size, the new response time measurement and the new I/O size measurement, determine by said processor a slope value and intercept values from the updated average response time, the updated average I/O size and the updated angle value, and store by said processor the updated average response time, the updated average I/O size, the updated angle value, the slope value and the intercept value on said computer-readable storage device.

\* \* \* \* \*